(12) United States Patent
Kawato et al.

(10) Patent No.: US 7,847,007 B2
(45) Date of Patent: *Dec. 7, 2010

(54) LIGHT-DIFFUSING RESIN COMPOSITION

(75) Inventors: Hiroshi Kawato, Chiba (JP); Masami Kogure, Chiba (JP); Yosihiko Horio, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 202 days.

This patent is subject to a terminal disclaimer.

(21) Appl. No.: 11/578,416

(22) PCT Filed: Apr. 5, 2005

(86) PCT No.: PCT/JP2005/006667

§ 371 (c)(1),
(2), (4) Date: Mar. 23, 2007

(87) PCT Pub. No.: WO2005/100476

PCT Pub. Date: Oct. 27, 2005

(65) Prior Publication Data

US 2007/0213452 A1 Sep. 13, 2007

(30) Foreign Application Priority Data

Apr. 14, 2004 (JP) .............................. 2004-118633

(51) Int. Cl.
C08K 5/521 (2006.01)
C08K 5/526 (2006.01)
C08K 5/5333 (2006.01)
C08K 3/36 (2006.01)

(52) U.S. Cl. .................. 524/493; 524/132; 524/140; 524/141; 524/147; 524/153; 524/492; 524/494; 525/146; 525/148; 525/461

(58) Field of Classification Search ......... 524/115–154, 524/266, 492–494; 525/146, 148, 461
See application file for complete search history.

(56) References Cited

U.S. PATENT DOCUMENTS

| 5,352,747 | A  | * | 10/1994 | Ohtsuka et al. | ............. | 525/464 |
| 6,808,804 | B2 | * | 10/2004 | Hotaka et al. | ................ | 428/357 |
| 7,009,001 | B2 | * | 3/2006 | Kawato et al. | ............. | 525/146 |
| 7,098,263 | B2 | * | 8/2006 | Mitsunaga et al. | .......... | 524/445 |
| 2007/0037906 | A1 | * | 2/2007 | Kawato et al. | ............. | 524/154 |

FOREIGN PATENT DOCUMENTS

| JP | 6 192556 | | 7/1994 |
| JP | 09 279001 | | 10/1997 |
| JP | 10 036655 | | 2/1998 |
| JP | 10 073725 | | 3/1998 |
| JP | 11 158364 | | 6/1999 |
| JP | 2000239407 | * | 9/2000 |
| JP | 2001 214049 | | 8/2001 |
| JP | 2002 60609 | | 2/2002 |
| JP | 2005 112963 | | 4/2005 |

OTHER PUBLICATIONS

U.S. Appl. No. 11/913,181, filed Oct. 31, 2007, Kogure, et al.

* cited by examiner

*Primary Examiner*—Peter Szekely
(74) *Attorney, Agent, or Firm*—Oblon, Spivak, McClelland, Maier & Neustadt, L.L.P.

(57) ABSTRACT

The present invention provides a light-diffusing resin composition comprising (A) an aromatic polycarbonate resin in an amount of 100 parts by mass, (B) an acrylic resin in an amount of 0.01 to 1 part by mass, and (C) a light-diffusing agent in an amount of 0.01 to 10 parts by mass, the light-diffusing resin composition which is usable for optical elements in the field of liquid crystal displays, such as light diffuser plates, optical lenses and optical guide plates, street lamp covers, glass substitutes such as laminated glass for vehicles or construction materials, and the like.

10 Claims, No Drawings

# LIGHT-DIFFUSING RESIN COMPOSITION

TECHNICAL FIELD

The present invention relates to a light-diffusing resin composition usable for optical elements in the field of liquid crystal displays, such as light diffuser plates, optical lenses and light guide plates, street lamp covers, glass substitutes such as laminated glass for vehicles or construction materials, and the like.

BACKGROUND ART

In recent years, application of liquid crystal displays (LCD) has been growing, including not only notebook personal computers and monitors but also television sets (TV).

As a light diffuser plate (1 mm to 3 mm thick) for a direct-underlying-type backlight mounted on TV where high brightness is particularly requested, when the screen size is around 20 inches, a light diffuser plate of acrylic resin is mainly used. However, acrylic resins have poor dimensional stability because of their poor heat resistance and high hygroscopicity, so that light diffuser plates of large screen size have a problem of warp-deformation.

Therefore, nowadays polycarbonate resins, which are more excellent in heat resistance and hygroscopicity than acrylic resins, are used as matrix resins for light diffuser plates. The demand of polycarbonate resins is growing.

Compositions obtained by blending light-diff-using agents with ordinary polycarbonate resins are already publicly known (see, for example, Patent documents 1 to 5).

A light diffuser plate comprising a polycarbonate resin as a transparent resin for matrix is more excellent in heat resistance, impact strength, and hygroscopicity than a light diffuser plate of acrylic resin. When a light-diffusing agent is blended with a polycarbonate resin, however, the diffusing-light obtained after light diffusion exhibits yellowish color tone and lowered brightness because of poor transparency of the polycarbonate resin itself as compared with an acrylic resin. This point has been a disadvantage of light diffuser plate of polycarbonate resin.

That is, light diff-user plates of polycarbonate resin have a disadvantage that they absorb more light at the side of short wavelength than light diffuser plates of acrylic resin during repeated scattering (multiple scattering), shifting the diffusing-light to the longer wavelength. Accordingly, light diffuser plates of polycarbonate resin cause large deterioration in brightness and color tone on the resulting diffusing-light, and improvement of their light guiding properties is desired.

Patent document 1: Description of Japanese Patent No. 3100853
Patent document 2: Description of Japanese Patent No. 3357809
Patent document 3: Description of Japanese Patent No. 3447156
Patent document 4: Description of Japanese Patent No. 3447848
Patent document 5: Japanese Patent Laid-open Publication No. H10-46018

DISCLOSURE OF INVENTION

It is an object of the present invention to provide a light-diffusing resin composition usable for optical elements in the field of liquid crystal displays, such as light diffuser plates, optical lenses, and light guide plates, street lamp covers, glass substitutes such as laminated glass for vehicles or construction materials, and the like.

The present inventors intensively investigated to achieve the above object, and as a result, they found that a light-diffusing resin composition excellent in brightness, color tone, steam resistance, and thermal stability on molding is obtained by blending a specific component in a given ratio with an aromatic polycarbonate resin. Based on this finding, they have accomplished the present invention.

Namely, the present invention provides:

1. A light-diffusing resin composition comprising, 0.01 to 1 part by mass of (B) an acrylic resin, and 0.01 to 10 parts by mass of (C) a light-diffusing agent with respect to 100 parts by mass of (A) an aromatic polycarbonate resin.
2. The light-diffusing resin composition described in 1, which further comprises 0.001 to 0.5 part by mass of (D) a phosphorus-based stabilizer with respect to 100 parts by mass of component (A).
3. The light-diffusing resin composition described in 1 or 2, which further comprises, with respect to 100 parts by mass of component (A), 0.01 to 1 part by mass of (E) an organopolysiloxane having a refractive index that differs by 0.1 or less from that of component (A).
4. The light-diffusing resin composition described in 1 to 3, which further comprises 0.001 to 1 part by mass of (F) an alicyclic epoxy compound with respect to 100 parts by mass of component (A).
5. The light-diff-using resin composition described in 1, wherein component (B) has a viscosity average molecular weight of 1000 to 200000.
6. The light-diffusing resin composition described in 1, wherein component (C) is one kind or a combination of two or more kinds of materials selected from cross-linked polymethylmethacrylate resin particles, silicone resin particles, polyorganosilsesquioxane particles, silica particles, quartz particles, silica fibers, quartz fibers, and glass fibers.
7. The light-diffusing resin composition described in 1, wherein component (C) has an average particle diameter of 1 to 200 μm.
8. The light-diffusing resin composition described in 2, wherein component (D) is a phosphate ester compound and/or an aromatic phosphine compound.

The light-diff-using resin composition of the present invention, owing to accomplishment of higher brightness and reduced yellowish color tone of the diffusing-light, provides a light diffuser plate more excellent in brightness, color tone, steam resistance, and thermal stability on molding than conventional light diffuser plates of polycarbonate resin.

BEST MODE FOR CARRYING OUT THE INVENTION

The present invention is described in detail below.

1. Components of a Light-diffusing Resin Composition and Blending Amounts Thereof (1) Aromatic Polycarbonate Resin [Component (A)]

In the light-diffusing resin composition of the present invention, as an aromatic polycarbonate resin used as component (A), there may be mentioned aromatic polycarbonate resins produced by conventional methods, that is, generally by reacting a dihydric-phenol and a carbonate precursor such as phosgene and carbonate ester compounds.

Specifically, the aromatic polycarbonate resin is produced, for example, in a solvent such as methylene chloride, in the presence of a publicly known acid acceptor and a molecular weight modifier, further if necessary with addition of a branching agent, by reaction of a dihydric-phenol and a carbonate precursor such as phosgene or by ester-exchange reaction of a dihydric-phenol and a carbonate precursor such as diphenyl carbonate.

As the dihydric-phenol, there may be mentioned various compounds, and 2,2-bis(4-hydroxyphenyl)propane (commonly called bisphenol A) is particularly suitable.

As bisphenols other than bisphenol A, there may be mentioned, for example, bis(hydroxyaryl)alkanes such as bis(4-hydroxyphenyl)methane, 1,1-bis(4-hydroxyphenyl)ethane, 2,2-bis(4-hydroxyphenyl)butane, 2,2-bis(4-hydroxyphenyl)octane, bis(4-hydroxyphenyl)phenylmethane, 2,2-bis[4-hydroxy-3-methylphenyl]propane, bis(4-hydroxyphenyl)naphthylmethane, 1,1-bis(4-hydroxy-t-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl)propane, and 2,2-bis(4-hydroxy-3,5-dibromophenyl)propane; bis(hydroxyaryl)cycloalkanes such as 1,1-bis(4-hydroxyphenyl)cyclopentane, 1,1-bis(4-hydroxyphenyl)cyclohexane, and 1,1-bis(4-hydroxyphenyl)-3,5,5-trimethylcyclohexane; dihydroxyaryl ethers such as 4,4'-dihydroxyphenyl ether and 4,4'-dihydroxy-3,3'-dimethylphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; dihydroxydiaryl sulfones such as 4,4'-dihydroxydiphenyl sulfone and 4,4'-dihydroxy-3,3'-dimethyldiphenyl sulfone; dihydroxydiphenyls such as 4,4'-dihydroxydiphenyl; and the like.

These dihydric-phenols may be used solely or as a mixture of two or more kinds of them.

As the carbonate ester compound, there may be mentioned diaryl carbonates such as diphenyl carbonate, dialkyl carbonates such as dimethyl carbonate and diethyl carbonate.

As the molecular weight modifier, there may be mentioned various kinds of compounds generally used in the polymerization for aromatic polycarbonate resins.

Specifically, as a monohydric-phenol, there may be mentioned, for example, phenol, o-n-butylphenol, m-n-butylphenol, p-n-butylphenol, o-isobutylphenol, m-isobutylphenol, p-isobutylphenol, o-t-butylphenol, m-t-butylphenol, p-t-butylphenol, o-n-pentylphenol, m-n-pentylphenol, p-n-pentylphenol, o-n-hexylphenol, m-n-hexylphenol, p-n-hexylphenol, p-t-octylphenol, o-cyclohexylphenol, m-cyclohexylphenol, p-cyclohexylpheol, o-phenylphenol, m-phenylphenol, p-phenylphenol, o-n-nonylphenol, m-nonylphenol, p-n-nonylphenol, o-cumylphenol, m-cumylphenol, p-cumylphenol, o-naphthylphenol, m-naphthylphenol, p-naphthylphenol, 2,5-di-t-butylphenol, 2,4-di-t-butylphenol, 3,5-di-t-butylphenol, 2,5-dicumylphenol, 3,5-dicumylphenol, p-cresol, bromophenol, tribromophenol, and the like.

Among these monohydric-phenols, p-t-butylphenol, p-cumylphenol, p-phenylphenol, and the like are preferably used.

As the branching agent, for example, there may be used a compound having three or more functional groups such as 1,1,1-tris(4-hydroxyphenyl)ethane, α,α',α"-tris(4-hydroxyphenyl)-1,3,5-triisopropylbenzene, 1-[α-methyl-α-(4'-hydroxyphenyl)ethyl]-4-[α',α'-bis(4"-hydroxyphenyl)ethyl]benzene, phloroglucinol, trimellitic acid, isatin bis(o-cresol), and the like.

Generally, the viscosity average molecular weight of the aromatic polycarbonate resin used in the present invention is preferably 10,000 to 100,000, more preferably 15,000 to 40,000.

(2) Acrylic resins [Component (B)]

The acrylic resin used in the present invention refers to a polymer comprising, as a repeating unit, a monomer unit of acrylic acid, acrylate ester, methacrylic acid, methacrylate ester, acrylonitrile, methacrylonitrile, or a derivative thereof, and it includes a homopolymer or a copolymer with styrene, butadiene, or the like.

Specifically, there may be mentioned polyacrylic acid, polymethyl methacrylate (PMMA), polyacrylonitrile, ethyl acrylate/2-chloroethyl acrylate copolymer, n-butyl acrylate/acrylonitrile copolymer, acrylonitrile/styrene copolymer, acrylonitrile/butadiene copolymer, acrylonitrile/butadiene/styrene copolymer, and the like. Of these, particularly polymethyl methacrylate (PMMA) is suitably used.

Publicly known polymethyl methacrylate (PMMA) may be used, which is usually produced through bulk polymerization of methyl methacylate monomers in the presence of a peroxide or an azo-type initiator.

The acrylic resin has a viscosity average molecular weight of usually 1000 to 200000, preferably 20000 to 100000.

With a viscosity average molecular weight in the above range, the acrylic resin is excellent in compatibility with the aromatic polycarbonate resin used as a matrix.

The acrylic resin used in the present invention is blended in an amount of usually 0.01 to 1 part by mass, preferably 0.05 to 0.5 part by mass, more preferably 0.1 to 0.3 part by mass, with respect to 100 parts by mass of the aromatic polycarbonate resin.

When the blending amount of the acrylic resin is 0.01 part by mass or more, the aromatic polycarbonate resin used as a matrix exhibits good light guiding ability, resulting in improvement of brightness.

When the blending amount is 1 part by mass or less, the acrylic resin component does not cause phase separation, and therefore no clouding occurs, so that the light guiding ability of the aromatic polycarbonate resin is not impaired, resulting in improvement of brightness.

(3) Light-diffusing Agent [Component (C)]

The light-diffusing agent used in the present invention is optically transparent and has a refractive index different from that of the aromatic polycarbonate resin.

A specific example of the light-diffusing agent includes cross-linked polymethy methacrylate resin particles, silicone resin particles, polyorganosilsesquioxane particles, silica particles, quartz particles, silica fibers, quartz fibers, glass fibers, and the like. Among them, cross-linked polymethyl methacrylate resin particles, silicone resin particles, polyorganosilsesquioxane particles, silica particles, and quartz particles are preferably used.

These light-diffusing agents may be used solely or in combination of two or more kinds of them.

The light-diffusing agent used in the present invention is blended in an amount of 0.01 to 10 parts by mass, preferably 0.05 to 8 parts by mass, more preferably 0.1 to 6 parts by mass, with respect to 100 parts by mass of the aromatic polycarbonate resin.

When the blending amount of the light-diffusing agent is 0.01 part by mass or more, light-diffusing ability emerges and brightness is increased.

When the blending amount is 10 parts by mass or less, light-diffusing ability is not excess and brightness is not lowered.

The average particle diameter of the light-diffusing agent is usually 1 to 200 μm, preferably 1 to 150 μm, more preferably 20 to 100 μm.

With the light-diffusing composition of the present invention, the following additives may be further blended as necessary.

(4) Phosphorus-based Stabilizer [Component (D)]

The phosphorus-based stabilizer used in the present invention is a phosphoric acid-related compound and/or an aromatic phosphine compound.

The phosphoric acid-related compound includes phosphorous acid, phosphoric acid, phosphonous acid, phosphonic acid, esters thereof, and the like. Specifically, there may be mentioned triphenyl phosphite, tris(nonylphenyl) phosphite, tris(2,4-di-tert-butylphenyl) phosphite, tridecyl phosphite, trioctyl phosphite, trioctadecyl phosphite, didecyl monophenyl phosphite, dioctylmonophenyl phosphite, diisopropyl monophenyl phosphite, monobutyl diphenyl phosphite, monodecyl diphenyl phosphite, monooctyl diphenyl phosphite, bis(2,6-di-tert-butyl4-methylphenyl) pentaerythritol diphosphite, 2,2-methylenebis(4,6-di-tert-butylpbenyl) octyl phosphite, bis(nonylphenyl) pentaerythritol diphosphite, bis (2,4-di-tert-butylphenyl) pentaerythritol diphosphite, distearyl pentaerythritol diphosphite, tributyl phosphate, triethyl phosphate, trimethyl phosphate, triphenyl phosphate, diphenyl monoorthoxenyl phosphate, dibutyl phosphate, dioctyl phosphate, diisopropyl phosphate, tetrakis(2,4-di-tert-butylphenyl) 4,4'-biphenylenediphosphonate, dimethyl benzenephosphonate, diethyl benzenephosphonate, dipropyl benzenephosphonate, and the like.

Tris(nonylphenyl) phosphite, trimethyl phosphate, tris(2, 4-di-tert-butylphenyl) phosphite, and dimethyl benzenephosphonate are preferred.

The aromatic phosphine compound is exemplified by arylphosphine compounds represented by general formula (1):

$$P\text{—}(X)_3 \quad (1),$$

wherein X is a hydrocarbon group, at least one of which is an optionally substituted aryl group having 6 to 18 carbon atoms.

As the arylphosphine compound of general formula (1), there may be mentioned, for example, triphenylphosphine, diphenylbutylphosphine, diphenyloctadecylphosphine, tris (p-tolyl)phosphine, tris(p-nonylphenyl)phosphine, trinaphthylphosphine, diphenyl(hydroxymethyl)phosphine, diphenyl(acetoxymethyl)phosphine, diphenyl(β-ethylcarboxyethyl)phosphine, tris(p-chlorophenyl) phosphine, tris(p-fluorophenyl)phosphine, diphenylbenzylphosphine, diphenyl-β-cyanoethylphosphine, diphenyl(p-hydroxyphenyl)phosphine, diphenyl(2,5-dihydroxyphenyl)phosphine, phenylnaphthylbenzylphosphine, and the like.

Among them, triphenylphosphine is, in particular, preferably used.

The above-described phosphorous-based stabilizers may be used solely or in combination of two or more kinds of them.

The blending amount of the phosphorous-based stabilizer used in the present invention is usually 0.001 to 0.5 part by mass, preferably 0.005 to 0.3 part by mass, more preferably 0.01 to 0.1 part by mass, with respect to 100 parts by mass of the aromatic polycarbonate resin.

(5) Organopolysiloxane [Component (E)]

The organopolysiloxane used in the present invention has at least one kind of group selected from a phenyl group, a vinyl group, and an alkoxy group, including, for example, a reactive silicone-based compound (organosiloxane and the like) obtained by introducing at least one kind of group selected from a phenyl group, a vinyl group, and an alkoxy group into a silicone-based compound.

A preferred organopolysiloxane is exemplified by an organopolysiloxane having a phenyl and a vinyl and/or an alkoxy group(s).

The organopolysiloxane used in the present invention has a refractive index that differs by 0.1 or less, preferably by 0.09 or less, more preferably by 0.08 or less from that of the aromatic polycarbonate resin (A).

The blending amount of the organopolysiloxane used in the present invention is usually 0.01 to 1 part by mass, preferably 0.02 to 0.8 part by mass, more preferably 0.03 to 0.3 part by mass, with respect to 100 parts by mass of the aromatic polycarbonate resin.

With a blending amount of the organopolysiloxane in the above range, thermal stability on molding is improved.

(6) Alicyclic Epoxy Compound [Component (F)]

The alicyclic epoxy compound used in the present invention means a cyclic aliphatic compound that has an alicyclic epoxy group, that is, an epoxy group in which one oxygen atom is added to an ethylenic bond in an aliphatic ring. Specifically, compounds represented by Formulae (2) to (11) are preferably used.

[Formula 1]

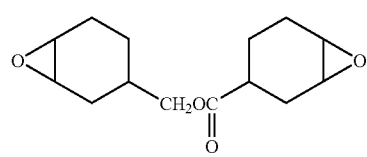

(2)

[Formula 2]

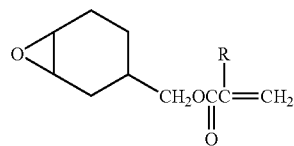

(3)

wherein R is H or $CH_3$.

[Formula 3]

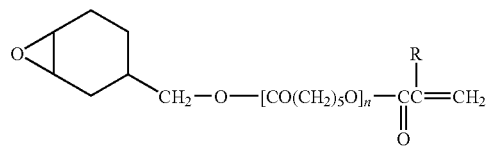

(4)

wherein R is H or $CH_3$; n=1 on an average.

[Formula 4]

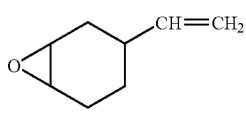
(5)

[Formula 5]

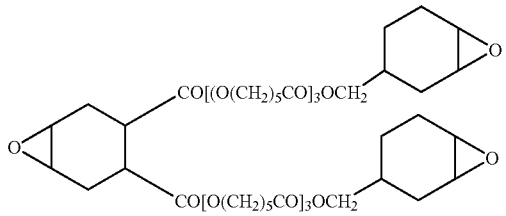
(6)

wherein (a+b)=1 or 2.

[Formula 6]

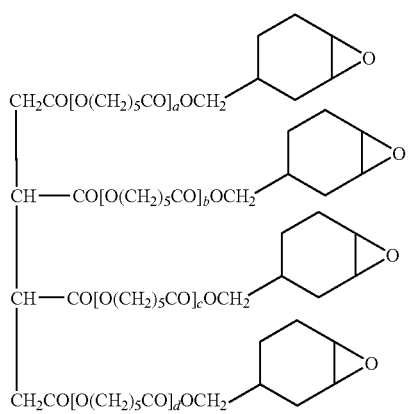
(7)

wherein (a+b+c+d)=1 to 3.

[Formula 7]

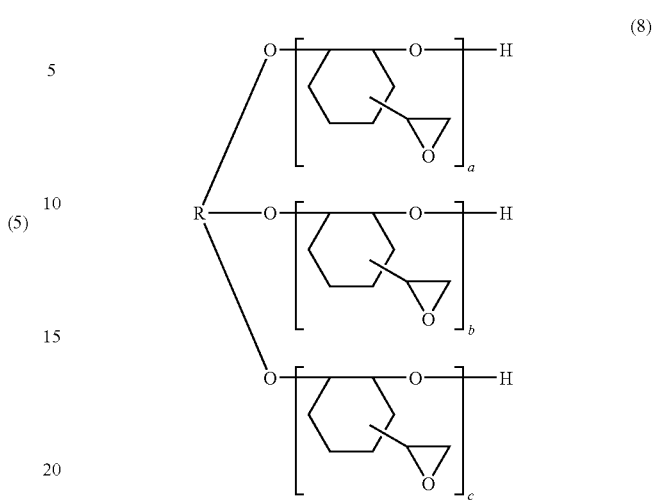
(8)

wherein (a+b+c+d)=n (integer); R is a hydrocarbon group.

[Formula 8]

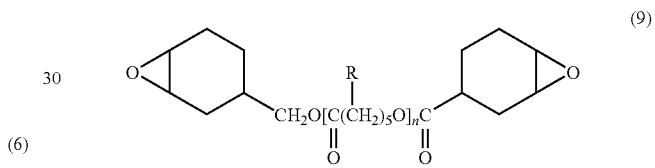
(9)

wherein n is an integer; R is a hydrocarbon group.

[Formula 9]

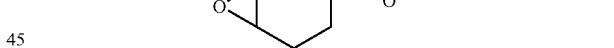
(10)

wherein R is a hydrocarbon group.

[Formula 10]

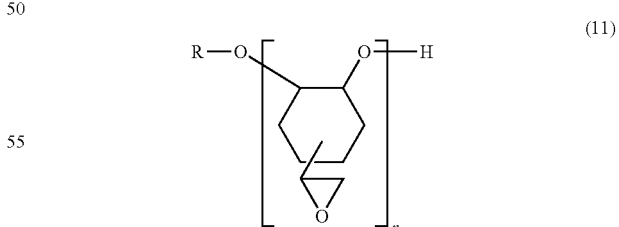
(11)

wherein n is an integer; R is a hydrocarbon group.

Of these, the compound represented by Formula (2), Formula (8), or Formula (11) is preferred, because it is excellent in compatibility with the aromatic polycarbonate resin and does not impair transparency.

The blending amount of the alicyclic epoxy compound is 0.001 to 1 part by mass, preferably 0.005 to 0.8 part by mass, more preferably 0.01 to 0.5 part by mass, with respect to 100 parts by mass of the aromatic polycarbonate resin.

With a blending amount of the alicyclic epoxy compound in the above range, steam resistance is improved.

2. Blending and Kneading of Each Component:

There is no particular limitation on the method for blending and kneading each component described above. A conventional method can be used.

For example, blending and kneading can be performed with a ribbon blender, a Henschel mixer, a Banbury mixer, a drum tumbler, a single-screw extruder, a twin-screw extruder, a cokneader, a multi-screw extruder, and the like.

Suitable beating temperature on kneading is usually 280 to 320° C.

The polycarbonate-based resin composition of the present invention can provide an optical element by molding.

The optical element includes, for example, a light diffuser plate, an optical lens, a light guide plate, a street lamp cover, a laminated glass for vehicles or construction materials, and the like.

EXAMPLES

Hereinafter, the present invention will be further described in detail with reference to Examples, Comparative Examples, and Reference Examples, but it should be construed that the present invention is in no way limited to these examples.

(1) The materials used in Examples, Comparative Examples, and Reference Examples are as follows:

(A) Aromatic Polycarbonate (PC) Resins
1. TARFLON FN1500A (Trade name, manufactured by Idemitsu Petrochemical Co., Ltd., viscosity average molecular weight 15000, refractive index 1.585);
2. TARFLON FN2200A(Trade name, manufactured by Idemitsu Petrochemical Co., Ltd, viscosity average molecular weight 22000, refractive index 1.585).

The viscosity average molecular weight, Mv, was calculated from the equation of $[\eta]=1.23\times10^{-5}Mv^{0.83}$ using the intrinsic viscosity, $[\eta]$, measured in a metbylene chloride solution at 20° C. with a Ubbelode viscometer.

(B) Acrylic Resins
1. Thermoplastic polymethyl methacrylate resin (PMMA): DIANAL BR87 (Trade name, manufactured by Mitsubishi Rayon Co., Ltd., viscosity average molecular weight 40000);
2. Thermoplastic polymethyl methacrylate resin (PMMA): SUMIEX MHF (Trade name, manufactured by Sumitomo Chemical Co., Ltd., viscosity average molecular weight 200000).

The molecular weight was obtained by calculating the average polymerization degree, PA, from the equation of log PA=1.613× log ($[\eta]\times10^4/8.29$) using the intrinsic viscosity, $[\eta]$, measured in a chloroform solution at 25° C. with an Ostwald viscometer.

(C) Light-diffusing Agents
1. Cross-linked acrylic resin beads 1: Techpolymer MBX-20 (Trade name, manufactured by Sekisui Plastics Co., Ltd., average particle diameter 20 μm);
2. Cross-linked silicone resin 1: Torayfil R900 (Trade name, manufactured by Dow Corning Toray Co., Ltd., irregular shape, average particle diameter 20 μm);
3. Polyorganosilsesquioxane resin: Tospearl 145 (Trade name, manufactured by TOSHBA CORPORATION, spherical, average particle diameter 4.5 μm);
4. Cross-linked dimethylsiloxane resin: KMP598 (Trade name, manufactured by Shin-Etsu Chemical Co., Ltd., spherical, average particle diameter 13 μm);
5. Cross-linked dimethylsiloxane resin: X-52-875 (Trade name, manufactured by Shin-Etsu Chemical Co., Ltd., irregular shape, average particle diameter 40 μm).

(D) Phosphorous-based Stabilizers
1. Tris (2,4-di-tert-butylphenyl) phosphite: Irgafos 168 (Trade name, manufactured by Ciba Specialty Chemicals K.K.);
2. Bis (2,6-tert-butyl-4-methylphenyl) pentaerythrytol diphosphite: Adekastab PFP36 (Trade name, manufactured by ASAHI DENKA Co. Ltd.);
3. Triphenylphosphine: JC-263 (Trade name, manufactured by JOHOKU CHEMICALS CO., LTD.).

(E) Organopolysiloxanes
1. Organopolysiloxane compound having phenyl groups, vinyl groups, and methoxy groups: KR-511 (Trade name, manufactured by Shin-Etsu Chemical Co., Ltd., refractive index 1.518);
2. Organopolysiloxane compound having phenyl groups, vinyl groups, and methoxy groups: KR-219 (Trade name, manufactured by Shin-Etsu Chemical Co., Ltd., refractive index 1.510);

(F) Alicyclic Epoxy Compounds
1. Alicyclic epoxy compound: CELLOXDE 2021P (Trade name, manufactured by DAICEL CHEMICAL INDUSTRIES, LTD., compound of Formula (2));
2. Alicyclic epoxy compound having a methacryl group: M100 (Trade name, manufactured by DAICEL CHEMICAL INDUSTRIES, LTD., compound of Formula (3) where R is a methyl group).

(G) Commercial Light Diffuser Plates
1. Polycarbonate (PC) resin-base light diffuser plate (manufactured by TEIJIN CHEMICALS LTD.);
2. Polymethyl methacrylate (PMMA) resin-base light diffuser plate (manufactured by ASAHI KASEI CORPORATION).

(2) Methods for evaluating each property are as follows:
1. Average brightness: a cold-cathode fluorescent tube was placed with a gap of 1 mm on Lumirror E60L (Trade name, manufactured by Toray Industries, Inc.); a molded article for evaluation or a commercial light diffuser plate was placed above the cold-cathode fluorescent tube with a distance of 12 mm from the light source; one sheet of light-diffusing film (manufactured by Keiwa Shoko Co., Ltd.) was further laminated on the light diffuser plate; and an average brightness (cd/m$^2$) of diffusing-light (outgoing light) at the position just above the light source was measured with a luminance meter LS-110 manufactured by Minolta Camera, Inc.
2. Diffusing-light color tone: a cold-cathode fluorescent tube was placed with a gap of 1 mm on Lumirror E60L (Trade name, manufactured by Toray Industries, Inc.); a molded article for evaluation or a commercial light diffuser plate was placed above the cold-cathode fluorescent tube with a distance of 12 mm from the light source; one sheet of light-diffusing film (manufactured by Keiwa Shoko Co, Ltd.) was further laminated on the light diffuser plate; a color tone of diffusing-light (YI-value in accordance with JIS-K-7105) was measured at the position just above the light source with a colorimeter MS2020 Plus(manufactured by Gretag-Macbeth Holding AC, F light source, 10 degree visual field; J transmission mode).

3. Thermal stability on molding: the appearance of a molded article for evaluation was evaluated by visual observation.

The appearance was graded into two: "excellent" (clear and colorless; no silver streaks were developed) and "do" (slightly yellow colored; silver streaks were developed).

4. Steam resistance: a molded article for evaluation was put in a test chamber for stream resistance (manufactured by Hirayama Manufacturing Corporation) and exposed to saturated steam at 120° C. for 50 hr; after that, the change in appearance was evaluated by visual observation.

The appearance was graded into three: "excellent" (no change), "good" (no clouding, only crazes were developed), and "do" (clouding).

Examples 1 to 10, Comparative Examples 1 to 4, and Reference Examples 1 and 2

The components were mixed in the ratio shown in Table 1, and then the resulting mixture was kneaded and palletized with a single-screw extruder having a bore diameter of 40 mm at a screw revolution of 100 rpm at 280° C.

The resulting pellets were molded into a molded article for evaluation (14 mm square and 3 mm thick in size) with an injection molder at a molding temperature of 300° C. and a mold temperature of 100° C. The molded article was subjected to each of the evaluations.

The evaluation results are shown in Table 1.

[Table 1]

TABLE 1

| Blending components | PC resin | | Acrylic resin | | Light-diffusing agent | | | | | Phosphorus-based stabilizer | | | Organo-polysiloxane | | Alicyclic epoxy compound | |
|---|---|---|---|---|---|---|---|---|---|---|---|---|---|---|---|---|
| | | | | | | | Component number | | | | | | | | | |
| (parts by mass) | 1 | 2 | 1 | 2 | 1 | 2 | 3 | 4 | 5 | 1 | 2 | 3 | 1 | 2 | 1 | 2 |
| Examples 1 | 100 | — | 0.05 | — | 1 | — | | | | 0.03 | — | — | — | — | — | — |
| 2 | — | 100 | 0.1 | — | 3 | — | | | | — | 0.05 | — | — | — | — | — |
| 3 | — | 100 | 1 | — | 1 | — | | | | — | — | 0.05 | 0.01 | — | — | — |
| 4 | — | 100 | — | 0.1 | 3 | — | | | | — | 0.05 | — | 0.05 | — | — | — |
| 5 | — | 100 | — | 1 | 5 | — | | | | — | 0.1 | — | — | 0.1 | — | — |
| 6 | — | 100 | — | 0.3 | — | 2 | | | | 0.03 | — | — | 0.01 | — | 0.01 | — |
| 7 | — | 100 | — | 0.3 | — | — | 2 | | | 0.03 | — | — | 0.05 | — | 0.05 | — |
| 8 | — | 100 | — | 0.3 | — | — | — | 2 | | 0.03 | — | — | — | 0.1 | — | 0.1 |
| 9 | — | 100 | — | 0.3 | — | — | — | — | 2 | 0.03 | — | — | 0.05 | — | — | 0.05 |
| 10 | — | 100 | — | 0.1 | 3 | — | | | | — | — | — | — | — | — | — |
| Comparative Examples 1 | — | 100 | — | — | 3 | — | — | — | — | 0.03 | — | — | — | — | — | — |
| 2 | — | 100 | — | 2 | 3 | — | — | — | — | 0.03 | — | — | — | — | — | — |
| 3 | — | 100 | — | 0.3 | 0 | — | — | — | — | 0.03 | — | — | — | — | — | — |
| 4 | — | 100 | — | 0.3 | 15 | — | — | — | — | 0.03 | — | — | — | — | — | — |
| Reference Examples 1 | Commercial PC-base light diffuser plate | | | | | | | | | | | | | | | |
| 2 | Commercial PMMA-base light diffuser plate | | | | | | | | | | | | | | | |

| Blending components (parts by mass) | | Average brightness (cd/m²) | Color tone of diffusing light YI | Thermal stability on molding | Steam resistance |
|---|---|---|---|---|---|
| Examples | 1 | 5700 | 61.0 | do | do |
| | 2 | 5600 | 61.3 | do | do |
| | 3 | 5600 | 60.9 | excellent | good |
| | 4 | 5700 | 71.8 | excellent | good |
| | 5 | 5700 | 68.3 | excellent | good |
| | 6 | 5800 | 75.2 | excellent | excellent |
| | 7 | 5700 | 70.2 | excellent | excellent |
| | 8 | 5800 | 61.3 | excellent | excellent |
| | 9 | 5600 | 70.1 | excellent | excellent |
| | 10 | 5600 | 73.5 | do | excellent |
| Comparative Examples | 1 | 5400 | 80.6 | do | do |
| | 2 | 4900 | 82.3 | do | do |
| | 3 | 4300 | 58.8 | do | do |
| | 4 | 3800 | 88.4 | do | do |
| Reference Examples | 1 | 5300 | 81.3 | — | — |
| | 2 | 5600 | 60.9 | — | — |

INDUSTRIAL APPLICABILITY

The light-diffusing resin composition of the present invention makes diffusing-light more brighter and less yellow-colored, whereby providing a light diffuser plate more excellent in brightness, color tone, steam resistance, and thermal stability on molding than conventional light diffuser plates of polycarbonate resin. The light-diffusing resin composition is usable for optical elements in the field of liquid crystal displays such as light diffuser plates, optical lenses and optical guide plates, street lamp covers, glass substitutes such as laminated glass for vehicles or building materials, and the like.

The invention claimed is:

1. A light-diffusing resin composition comprising:
   an aromatic polycarbonate resin (A),
   0.01 to 1 part by mass of (B) an acrylic resin having a viscosity average molecular weight of 1000 to 200000,
   0.01 to 10 parts by mass of (C) a light-diffusing agent,
   0.001 to 0.5 part by mass of (D) a phosphorous-based stabilizer,
   0.01 to 1 part by mass of (E) an organopolysiloxane having a refractive index that differs by 0.1 or less from that of component (A), and
   0.001 to 1 part by mass of (F) an alicyclic epoxy compound,
   wherein the part by mass of each of components (B), (C), (D), (E) and (F) is with respect to 100 parts by mass of (A).

2. The light-diffusing resin composition according to claim 1, wherein component (C) is at least one material selected from the group consisting of a cross-linked polymethyl methacrylate resin particle, a silicone resin particle, a polyorganosilsesquioxane particle, a silica particle, a quartz particle, a silica fiber, a quartz fiber, and a glass fiber.

3. The light-diffusing resin composition according to claim 1, wherein component (C) has an average particle diameter of 1 to 200 μm.

4. The light-diffusing resin composition according to claim 1, wherein component (D) is a phosphate ester compound and/or an aromatic phosphine compound.

5. The light-diffusing resin composition according to claim 1, wherein component (B) is selected from the group consisting of polyacrylic acid, polymethyl methacrylate (PMMA), polyacrylonitrile, ethyl acrylate/2-chloroethyl acrylate copolymer, n-butyl acrylate/acrylonitrile copolymer, acrylonitrile/styrene copolymer, acrylonitrile/butadiene copolymer, and acrylonitrile/butadiene/styrene copolymer.

6. The light-diffusing resin composition according to claim 1, wherein component (D) is selected from the group consisting of phosphorous acid, phosphoric acid, phosphonous acid, phosphonic acid, triphenyl phosphite, tris(nonylphenyl) phosphite, tris(2,4-di-tert-butylphenyl) phosphite, tridecyl phosphite, trioctyl phosphite, trioctadecyl phosphite, didecyl monophenyl phosphite, dioctylmonophenyl phosphite, diisopropyl monophenyl phosphite, monobutyl diphenyl phosphite, monodecyl diphenyl phosphite, monooctyl diphenyl phosphite, bis(2,6-di-tert-butyl-4-methylphenyl) pentaerythritol diphosphite, 2,2-methylenebis(4,6-di-tert-butylphenyl) octyl phosphite, bis(nonylphenyl) pentaerythritol diphosphite, bis(2,4-di-tert-butylphenyl) pentaerythritol diphosphite, distearyl pentaerythritol diphosphite, tributyl phosphate, triethyl phosphate, trimethyl phosphate, triphenyl phosphate, diphenyl monoorthoxenyl phosphate, dibutyl phosphate, dioctyl phosphate, diisopropyl phosphate, tetrakis (2,4-di-tert-butylphenyl) 4,4'-biphenylene-diphosphonate, dimethyl benzenephosphonate, diethyl benzenephosphonate, and dipropyl benzenephosphonate.

7. The light-diffusing resin composition according to claim 1, wherein component (F) is selected from the group consisting of compounds represented by formulas (2) through (11):

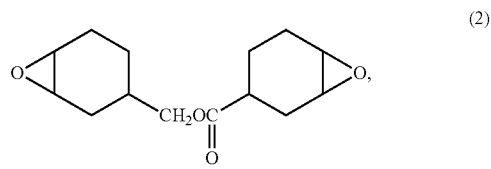

(2)

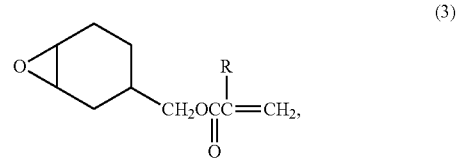

(3)

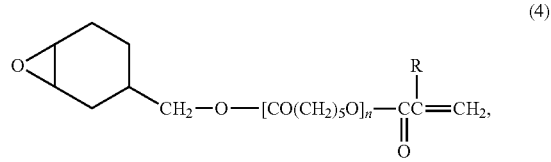

(4)

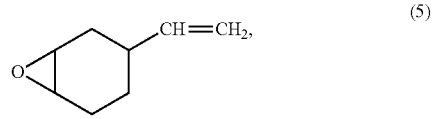

(5)

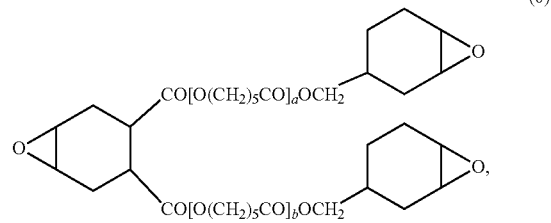

(6)

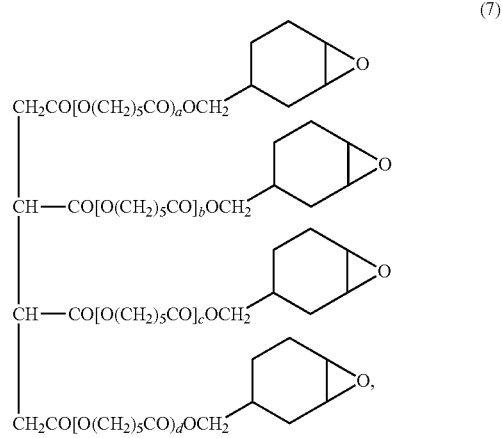

(7)

-continued

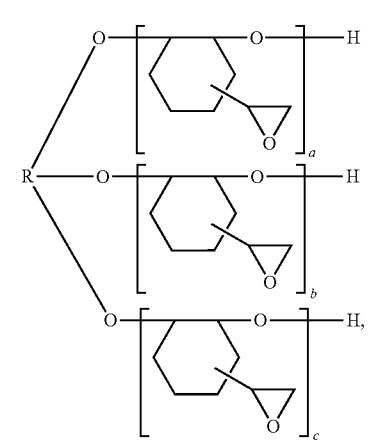
(8)

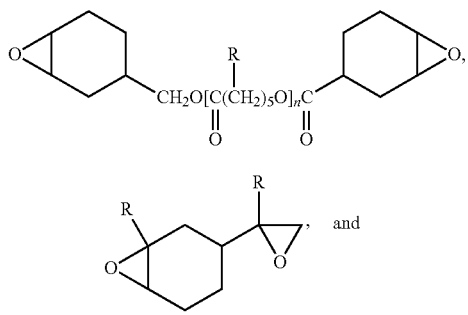
(9)

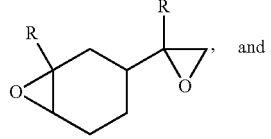, and
(10)

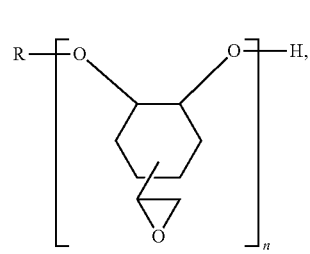
(11)

wherein n is an integer and R is a hydrocarbon group.

8. The light-diffusing resin composition according to claim 1, wherein a molded article of said light-diffusing resin composition has an average brightness of 5600 to 5800 cd/m$^2$.

9. The light-diffusing resin composition according to claim 1, wherein a molded article of said light-diffusing resin composition has a color tone of 60.9 to 75.2 YI.

10. The light-diffusing resin composition according to claim 1, wherein component (E) has a diphenyl group, a vinyl group and an alkoxy group.

* * * * *